UNITED STATES PATENT OFFICE.

SIGURD GIERTSEN, OF ODDA, NORWAY.

PROCESS OF CONVERTING CYANAMID INTO UREA AND AMMONIUM COMPOUNDS.

1,326,045. Specification of Letters Patent. Patented Dec. 23, 1919.

Application filed August 22, 1919. Serial No. 319,275.

*To all whom it may concern:*

Be it known that I, SIGURD GIERTSEN, a subject of the King of Norway, residing at Odda, Norway, have invented certain new and useful Improvements in Processes of Converting Cyanamid into Urea and Ammonium Compounds, of which the following is a specification.

The present invention relates to the decomposition of cyanamid, for example crude calcium cyanamid (lime nitrogen) to produce urea or ammonia, and the process involves the step of reacting with water upon the cyanamid in the presence of sulfurous acid (dissolved $SO_2$) at a pressure higher than ordinary atmospheric pressure.

Methods of decomposing cyanamid into urea are already known, according to which the reaction is effected by means of acid, for example sulfuric acid, and in some of these prior processes the operation has been conducted under superatmospheric pressure. The distinguishing feature of the process, as compared with such prior processes, is the employment of sulfurous acid in combination with water, instead of sulfuric acid.

In accordance with the present invention, the effect of the pressure and also the effect of the amount of pressure is of greater importance than in the said prior processes. In the prior processes the same amount of urea was obtained from a given quantity of cyanamid, whether atmospheric or superatmospheric pressure was employed. If sulfurous acid, however, is used, practically no formation of urea takes place at atmospheric pressure, whereas at elevated pressures, 95% or so of the cyanamid nitrogen is transformed into urea. In the present invention it is not necessary to supply the pressure from an exterior source, since the heating of the solution produces sufficient pressure for conducting the operation, this being on account of the fact that $SO_2$ is less soluble in hot water than in cold water. Also in the present process, the raising of the temperature has a favorable influence upon the reaction velocity.

While in the previously known processes, employing sulfuric acid, the most favorable temperature was between 110 and 120° C., when sulfurous acid is used the quantitative and rapid conversion of the cyanamid nitrogen into urea is obtained at between 80 and 90° C., so that less heating is necessary when using the present process. If it is desired in the present process to carry the conversion beyond the stage of urea and to form ammonium carbonate (or other ammonium salts), then it is necessary to heat to temperatures above 90° C., so that the influence of sulfurous acid and water upon the urea at temperatures above 90° C., forms ammonium compounds. An increase of pressure, of temperature, and degree of concentration of the sulfurous acid all tend to increase the reaction velocity.

Experimentation in accordance with the process of the present application has shown that the amount of conversion of cyanamid nitrogen into urea nitrogen which can be obtained in the present process is substantially greater than the amount which can be obtained in accordance with the processes of the prior art, and further, that this operation is conducted at a lower temperature than was used in the prior art, thereby producing a saving of fuel in the process. A further economy is caused by the fact that sulfurous acid is a cheap waste product from ore roasting and the like. It also possesses the advantage that at temperatures below 100° C., the vapor tension is so high that the pressure necessary is maintained ordinarily by the gas itself. The pressure further can be varied to suit the needs of the particular operation, by employing sulfurous acid at different stages of concentration for treating the cyanamid.

As examples of the present invention, and in order to further illustrate the same, the following are given: The crude cyanamid is first mixed with water containing $SO_2$ and thereupon heated under pressure, for example in an autoclave apparatus. If desired, these two operations can be conducted simultaneously in a single operation. The mixture is heated to about 90° C., under pressure, whereby substantially all of the cyanamid nitrogen is converted into urea nitrogen. In place of the technical calcium cyanamid aqueous solutions thereof may be used, or aqueous solutions of cyanamid, treated to precipitate the base (lime etc.,) contained therein. To accelerate the process catalyzers may be added to the mixture to be heated.

The reaction product can be dried and used as a fertilizer, or the urea can be separated from the solution in the well known manner. When commercial calcium cyanamid is used, other valuable by-products, such as calcium sulfite and graphite may be obtained. For the production of these by-products there will be employed so much $SO_2$ that the total calcium content of the crude lime nitrogen passes into solution (as calcium bisulfite) and the insoluble residue can be filtered off, such residue consisting largely of graphite. The filtrate which contains calcium bisulfite, may be treated to recover calcium monosulfite, either by driving off the dissolved $SO_2$ or by neutralizing the same with lime.

The ammonia formed during the process may be driven off or collected according to well known methods, or the ammonium sulfite formed during the process may be oxidized, for example by atmospheric air into ammonium sulfate in known manner.

I claim:

1. A process of converting cyanamid into urea, which comprises heating the same with aqueous sulfurous acid under superatmospheric pressure.

2. A process of converting calcium cyanamid into urea, which comprises heating the same with a sufficient excess of water containing sulfurous acid to dissolve substantially the entire amount of calcium sulfite produced, under superatmospheric pressure.

3. A process of converting calcium cyanamid associated with graphite into urea, which comprises heating the same under superatmospheric pressure with a sufficient excess of water containing sulfurous acid to dissolve substantially the entire amount of calcium sulfite produced, thereafter filtering off the graphite and precipitating calcium sulfite from the remaining liquor.

In testimony whereof I affix my signature.

SIGURD GIERTSEN.

Witnesses:
INGRID ENGELSEN,
GUDRUM PETTERSEN.